US012671124B2

(12) United States Patent
Kang et al.

(10) Patent No.: US 12,671,124 B2
(45) Date of Patent: Jun. 30, 2026

(54) BATTERY MODULE INCLUDING STRUCTURE FOR HEAT EXCHANGE AND FIRE PREVENTION

(71) Applicant: LG ENERGY SOLUTION, LTD., Seoul (KR)

(72) Inventors: Jae Hyuk Kang, Daejeon (KR); Jung Been You, Daejeon (KR); Jae Uk Ryu, Daejeon (KR); Ho June Chi, Daejeon (KR); Jin Young Choi, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 517 days.

(21) Appl. No.: 18/277,740

(22) PCT Filed: Oct. 25, 2022

(86) PCT No.: PCT/KR2022/016343
§ 371 (c)(1),
(2) Date: Aug. 17, 2023

(87) PCT Pub. No.: WO2023/075360
PCT Pub. Date: May 4, 2023

(65) Prior Publication Data
US 2024/0313288 A1 Sep. 19, 2024

(30) Foreign Application Priority Data
Oct. 29, 2021 (KR) ........................ 10-2021-0147221

(51) Int. Cl.
*H01M 10/613* (2014.01)
*A62C 3/16* (2006.01)
(Continued)

(52) U.S. Cl.
CPC ............. *H01M 10/613* (2015.04); *A62C 3/16* (2013.01); *A62C 35/10* (2013.01);
(Continued)

(58) Field of Classification Search
CPC ............. H01M 10/613; H01M 10/653; H01M 10/6556; H01M 10/6567; H01M 10/6569
See application file for complete search history.

(56) References Cited

U.S. PATENT DOCUMENTS

2012/0231304 A1 9/2012 Kaiser et al.
2014/0170447 A1 6/2014 Woehrle et al.
(Continued)

FOREIGN PATENT DOCUMENTS

CN 208622806 U 3/2019
CN 106972217 B 7/2019
(Continued)

*Primary Examiner* — Olatunji A Godo

(74) *Attorney, Agent, or Firm* — Bryan Cave Leighton Paisner LLP

(57) ABSTRACT

A battery module including a case having an accommodation space accommodating a battery; and a cooling and fire extinguishing module disposed on the case and configured to cool heat generated in the accommodation space and extinguish a fire occurring in the accommodation space, is provided. The cooling and fire extinguishing module includes a first space, through which a refrigerant moves, or in which the refrigerant is accommodated, and a second space which is separated from the first space and formed more adjacent to the accommodation space than the first space, and stores an extinguishing fluid.

13 Claims, 4 Drawing Sheets

(51) Int. Cl.

| | |
|---|---|
| *A62C 35/10* | (2006.01) |
| *H01M 10/653* | (2014.01) |
| *H01M 10/6556* | (2014.01) |
| *H01M 10/6567* | (2014.01) |
| *H01M 10/6569* | (2014.01) |
| *H01M 50/342* | (2021.01) |
| *H01M 50/375* | (2021.01) |
| *H01M 50/383* | (2021.01) |

(52) U.S. Cl.

CPC ..... *H01M 10/653* (2015.04); *H01M 10/6556* (2015.04); *H01M 10/6567* (2015.04); *H01M 10/6569* (2015.04); *H01M 50/342* (2021.01); *H01M 50/375* (2021.01); *H01M 50/383* (2021.01); *H01M 2200/10* (2013.01)

(56) References Cited

U.S. PATENT DOCUMENTS

| | | | |
|---|---|---|---|
| 2016/0087319 | A1 | 3/2016 | Roh et al. |
| 2018/0248160 | A1* | 8/2018 | Lee ..................... H01M 10/48 |
| 2022/0045386 | A1 | 2/2022 | Jo |
| 2022/0223934 | A1 | 7/2022 | Lee |
| 2023/0170552 | A1* | 6/2023 | Baeder .............. H01M 10/6568 |
| | | | 429/50 |
| 2024/0014461 | A1 | 1/2024 | Jo |
| 2024/0088473 | A1 | 3/2024 | Jo |

FOREIGN PATENT DOCUMENTS

| | | | |
|---|---|---|---|
| CN | 110085945 | A | 8/2019 |
| CN | 112216899 | A | 1/2021 |
| CN | 212700167 | U | 3/2021 |
| CN | 214181517 | U | 9/2021 |
| EP | 3879620 | A1 | 9/2021 |
| JP | 07-272751 | A | 10/1995 |
| JP | 2010-97836 | A | 4/2010 |
| JP | 2012-252909 | A | 12/2012 |
| JP | 2015-37043 | A | 2/2015 |
| JP | 5760713 | B2 | 6/2015 |
| JP | 2016511509 | A | 4/2016 |
| JP | 2017-147128 | A | 8/2017 |
| JP | 2019-29245 | A | 2/2019 |
| KR | 10-2012-0065346 | A | 6/2012 |
| KR | 10-2014-0005323 | A | 1/2014 |
| KR | 10-1583679 | B1 | 1/2016 |
| KR | 10-2019-0085005 | A | 7/2019 |
| KR | 10-2019-0086115 | A | 7/2019 |
| KR | 10-2123684 | B1 | 6/2020 |
| KR | 102149439 | B1 | 8/2020 |
| KR | 10-2020-0131618 | A | 11/2020 |
| KR | 10-2021-0109316 | A | 9/2021 |
| WO | 2020231095 | A1 | 11/2020 |

* cited by examiner

BATTERY MODULE INCLUDING STRUCTURE FOR HEAT EXCHANGE AND FIRE PREVENTION

CROSS-REFERENCE TO RELATED APPLICATIONS

This application is a National Phase entry pursuant to 35 U.S.C. 371 of International Application No. PCT/KR2022/016343 filed on Oct. 25, 2022, which claims the benefit of the priority of Korean Patent Application No. 10-2021-0147221, filed on Oct. 29, 2021, the disclosures of which are hereby incorporated by reference in their entirety.

FIELD

The present disclosure relates to a battery module including a structure for enabling heat exchange and fire prevention as well.

BACKGROUND

With an increasing need for alternative energy, research into techniques and development for power generation technologies based on energy sources such as solar heat, water power, wind power, ocean energy, and biomass energy, which have little impact on the environmental pollution, are carried out. In particular, research on secondary batteries capable of being repeatedly charged are actively carried out, and development is carried out on aspects such as the materials, efficiency, structures, stability, and systems of the secondary batteries.

Various types of secondary batteries are applied to electronic devices such as vehicles, mobile phones, and notebook computers, and when users use the electronic devices for a long time, heat generation and/or a fire may occur because of repeated charge/discharge cycles. In the aspects of stability of the secondary batteries and the systems including the secondary batteries, management of the heat generation/fire described above is necessary, and in order to minimize the impact of the heat generation/fire, cooling and fire prevention structures are proposed.

There are proposals for methods using cooling water for cooling and fire prevention purposes. For example, methods are proposed in which the cooling water absorbs the heat generated in the batteries to perform cooling, and the cooling water is supplied to a region where fire has occurred to extinguish the fire.

SUMMARY

According to the related art, when a bonding defect exists in a cooling and fire prevention structure, a cooling water may leak during cooling to cause a short circuit in a secondary battery. There may be also problems that stability of a secondary battery module and reliability for long-term use of the secondary battery module are reduced.

According to the related art, as the cooling water is used during both the cooling and extinguishment, there may be a problem that an effect of adaptively coping with the cooling and the fire prevention is reduced.

An object to be solved by the present disclosure is to provide a structure for a secondary battery module, which may adaptively cope with the cooling and the extinguishment by using a cooling structure and a fire extinguishing structure separated from the cooling structure and may suppress an occurrence of a short circuit in a secondary battery, which results from cooling water leakage due to a bonding defect.

A battery module according to the present disclosure may include: a case having an accommodation space that accommodates a battery; and a cooling and fire extinguishing module that is disposed on the case, cools heat generated in the accommodation space, and extinguishes a fire occurring in the accommodation space, wherein the cooling and fire extinguishing module includes a first space, through which a refrigerant that cools the heat moves, and a second space, which is separated from the first space and formed more adjacent to the accommodation space than the first space, and stores an extinguishing fluid for extinguishing the fire.

The cooling and fire extinguishing module may include a body, which includes the first space and the second space and is coupled to the case, and a separating plate which is disposed to cross the body and separate an inner space of the body into the first space and the second space.

The cooling and fire extinguishing module may include a first plate, which is coupled to the case so as to cover the accommodation space and forms a lower body, a separating plate, which has a portion coupled to the first plate and separates the first space and the second space from each other, and a second plate which has a portion coupled to the separating plate and forms an upper body.

The first plate and the separating plate may form the second space, and the separating plate and the second plate may form the first space.

The cooling and fire extinguishing module may include at least one connection hole, through which the second space and the accommodation space are spatially connected to each other, and a sealing member that seals the connection hole, wherein the sealing member is melted at a predetermined temperature or higher such that the sealing of the connection hole is released.

The sealing member may be melted at the predetermined temperature or higher such that the extinguishing fluid is ejected into the accommodation space.

The cooling and fire extinguishing module may receive the heat through at least one heat dissipating pad disposed to be in contact with the cooling and fire extinguishing module.

The cooling and fire extinguishing module may include a separating plate that separates the first space and the second space from each other, wherein a plurality of pin-shaped protrusions protruding toward the first space and the second space, respectively, are formed on the separating plate.

The extinguishing fluid may have a higher insulating property than the refrigerant.

The extinguishing fluid may have a lower boiling point than the refrigerant and transfer the heat through a phase change.

The battery module according to the present disclosure may adaptively cope with the cooling and the extinguishment by using the cooling structure and the fire extinguishing structure separated from the cooling structure.

The battery module according to the present disclosure may suppress the short circuit that may occur in the secondary battery because of the cooling water leaking due to the bonding defect of the partial structure in the battery module.

The battery module according to the present disclosure may improve the stability and the reliability of the battery module for the cooling and the fire prevention.

DETAILED DESCRIPTION

Figure 1:
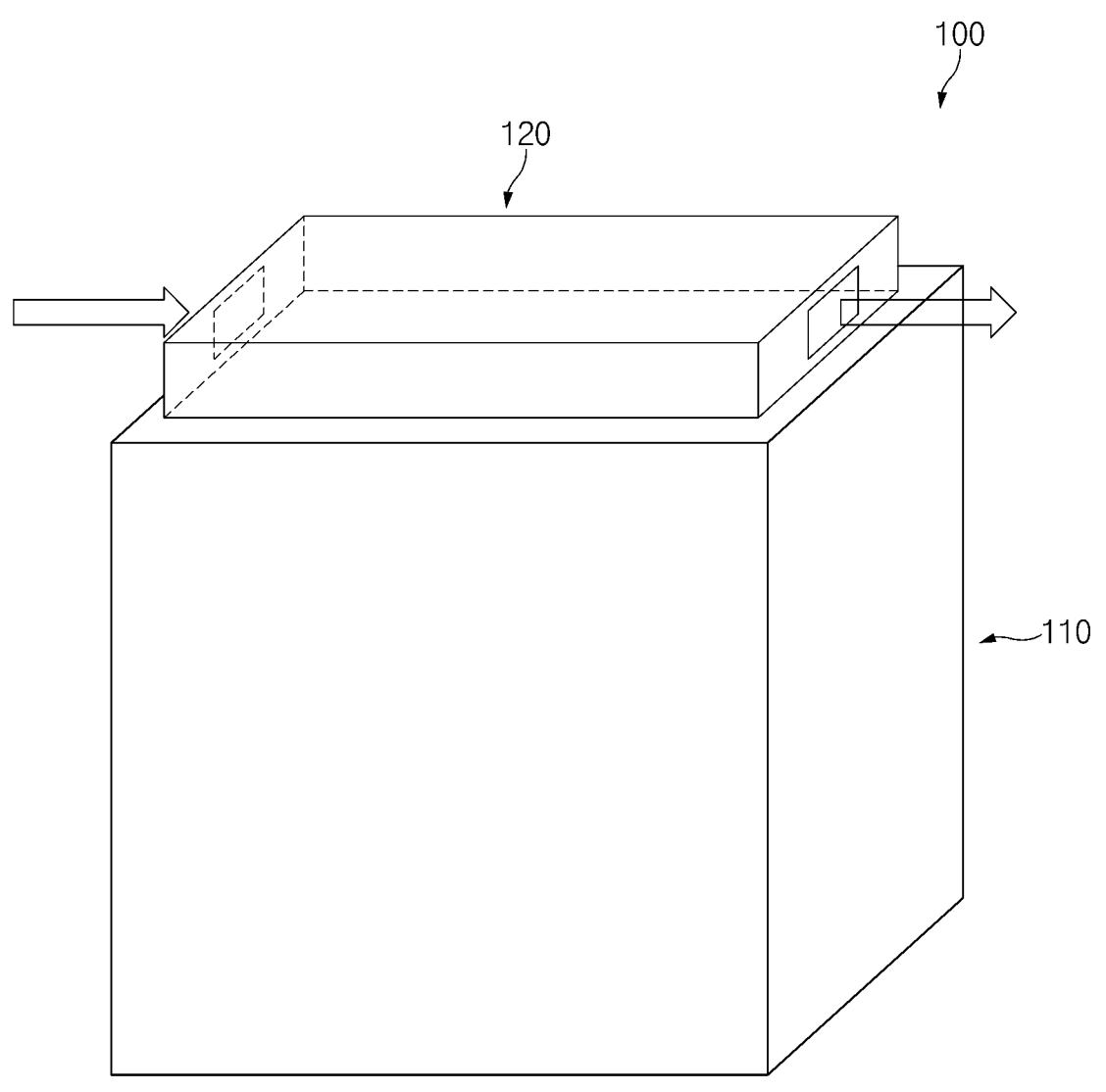
FIG. 1 is a perspective view illustrating a battery module according to an embodiment of the present disclosure.

Hereinafter, preferred embodiments of the present disclosure will be described in detail with reference to the accompanying drawings to enable those skilled in the art to which the present disclosure pertains to easily carry out the present disclosure. The present disclosure may, however, be embodied in different forms and should not be construed as limited by the embodiments set forth herein.

The parts unrelated to the description, or the detailed descriptions of related well-known art that may unnecessarily obscure subject matters of the present disclosure, will be ruled out in order to clearly describe the present disclosure. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her invention in the best ways.

FIG. 1 illustrates a battery module according to an embodiment of the present disclosure.

A battery module 100 may include a case 110.

An accommodation space, in which batteries (or a battery assembly) 111 may be accommodated, may be formed in the case 110.

The case 110 may have one surface opened. For example, the case 110 may include an opening surface having one opened surface, and the batteries 111 may be seated in the accommodation space inside the case 110 through the opening surface.

The battery module 100 may include a cooling and fire extinguishing module 120.

The cooling and fire extinguishing module 120 may include a first space 130 (or a refrigerant space) through which a refrigerant (or cooling water) used during cooling may move or in which the refrigerant (or cooling water) may be accommodated. For example, the refrigerant may pass through the first space 130 so as to cool the batteries 111 in the case 110.

The cooling and fire extinguishing module 120 may include a second space 140 (or an extinguishing fluid space) in which an extinguishing fluid used during fire prevention (or extinguishment) may be accommodated. For example, the extinguishing fluid may be stored in the second space 140 for the purpose of extinguishing a fire that may occur in the batteries 111 inside the case 110.

Gates through which the refrigerant may enter and exit may be formed in the cooling and fire extinguishing module 120. For example, one of the gates may be formed to allow the refrigerant to move into the cooling and fire extinguishing module 120, and the other of the gates may be formed to allow the refrigerant to move to the outside of the cooling and fire extinguishing module 120. The number and positions of the formed gates are provided as examples, and may change according to a design.

The cooling and fire extinguishing module 120 may be disposed on the case 110.

The cooling and fire extinguishing module 120 may be coupled on the one opened surface of the case 110. For example, the cooling and fire extinguishing module 120 may have a portion coupled on a portion at a side of the one opened surface of the case 110.

There may be a region in which the case 110 and the cooling and fire extinguishing module 120 overlap each other when viewed from a side. For example, the cooling and fire extinguishing module 120 may have a portion coupled to the case 110 in a state in which the portion is inserted into the accommodation space of the case 110. As the portion of the cooling and fire extinguishing module 120 is inserted into the accommodation space of the case 110, there may be an effect that the total size of the battery module 100 may be reduced.

Figure 2:
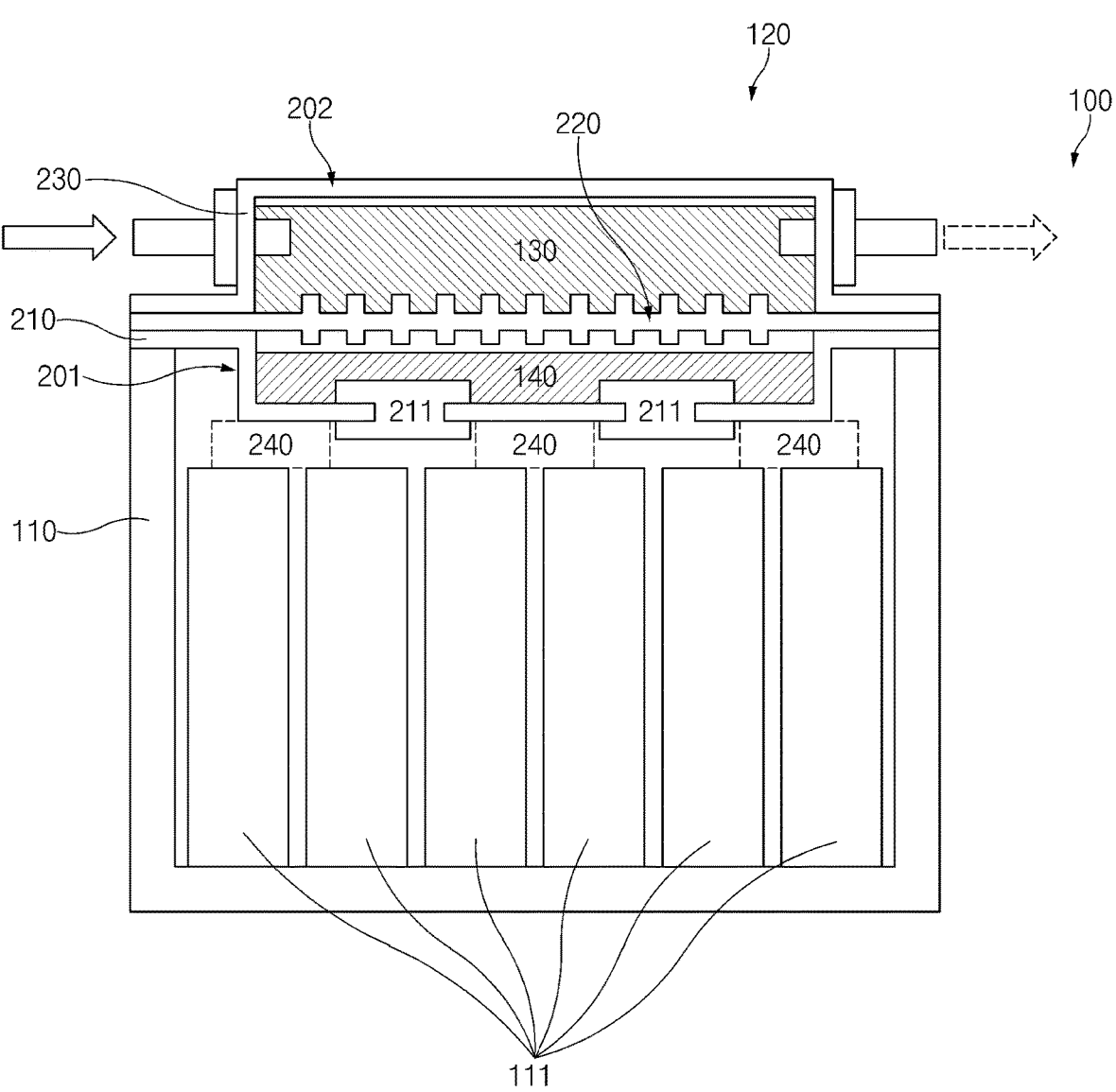
FIG. 2 is a view illustrating an inner structure of a battery module according to an embodiment of the present disclosure.

FIG. 2 illustrates an inner structure of a battery module according to an embodiment of the present disclosure.

As described with reference to FIG. 1, a battery module 100 may include a case 110. An accommodation space inside the case 110 is a space in which batteries 111 may be seated, and the batteries 111 may be applied to battery-related processes or an electronic system in a state in which the batteries 111 are accommodated and seated in the accommodation space.

A cooling and fire extinguishing module 120 may be coupled on the case 110. For example, the cooling and fire extinguishing module 120 may be coupled to the case 110 on one opened surface of the case 110. The cooling and fire extinguishing module 120 may be disposed to at least partially overlap the case 110 when viewed from a side.

The cooling and fire extinguishing module 120 may include a first space 130, through which a refrigerant may move or in which the refrigerant may be accommodated, and a second space 140 in which an extinguishing fluid may be stored. For example, the second space 140 may be formed to be more adjacent to the batteries 111 than the first space 130 is. The first space 130 and the second space 140 may be separate spaces that are not spatially connected to each other.

The first space 130 and the second space 140 of the cooling and fire extinguishing module 120 may be separated from each other by a separating plate 220. For example, the separating plate 220 may be disposed between the first space 130 and the second space 140, and as the separating plate 220 is disposed, the first space 130 and the second space 140 may be spatially separated from each other.

The cooling and fire extinguishing module 120 may include a lower body 201 and an upper body 202.

The cooling and fire extinguishing module 120 may include the separating plate 220 disposed between the lower body 201 and the upper body 202.

The lower body 201 may be formed of a first plate 210. For example, a stepped portion may be formed in the first plate 210, and a portion (e.g., an edge of the first plate 210) of the first plate 210 may be coupled on a portion (e.g., an edge of the case 110) of the case 110 to form the lower body 201 of the cooling and fire extinguishing module 120.

The separating plate 220 may have a portion coupled to a portion of each of the lower body 201 and the upper body 202. For example, an edge of the separating plate 220 may be coupled on the edge of the first plate 210 that forms the lower body 201, and an edge of a second plate 230 that forms the upper body 202 may be coupled on the edge of the separating plate 220.

The upper body 202 may be formed by the second plate 230. For example, a stepped portion may be formed in the second plate 230, and a portion (e.g., an edge of the second plate 230) of the second plate 230 may be coupled on a portion (e.g., an edge of the case 110) of the case 110 to form the upper body 202 of the cooling and fire extinguishing module 120.

The first plate 210, which forms the lower body 201, and the separating plate 220 may be coupled to each other to form the second space 140. For example, the second space 140 may be formed by disposing the first plate 210 at a lower side and the separating plate 220 at an upper side, and coupling a portion of the first plate 210 and a portion of the separating plate 220 to each other.

The second plate 230, which forms the upper body 202, and the separating plate 220 may be coupled to each other to form the first space 130. For example, the first space 130 may be formed by disposing the second plate 230 at an upper side and the separating plate 220 at a lower side, and coupling a portion of the second plate 230 and a portion of the separating plate 220 to each other.

The first space 130 may be a space through which the refrigerant may move. For example, gates through which the refrigerant may enter and exit may be formed in the second plate 230 that forms the upper body 202. For example, the refrigerant may enter the cooling and fire extinguishing module 120 through one of the gates formed in the second plate 230, and exit the cooling and fire extinguishing module 120 through the other of the gates formed in the second plate 230.

The second space 140 may include an extinguishing fluid. For example, the extinguishing fluid may have a lower boiling point than the refrigerant. A phase change of the extinguishing fluid may occur at the boiling point lower than that of the refrigerant, and the extinguishing fluid may transfer heat generated in the batteries 111 to the first space 130 through the phase change. There is an effect that the phase change characteristic of the extinguishing fluid may be used to maximize the cooling effect of the cooling and fire extinguishing module 120. For example, the extinguishing fluid may absorb the heat and cool the surroundings to have thermal diffusion and extinguishment effects greater than those of the refrigerant.

The extinguishing fluid may include an insulating material such as a fluorinated ketone, and have a higher insulating property than the refrigerant.

At least one connection hole, through which the second space 140 and the accommodation space of the case 110 are spatially connected to each other, may be formed in the first plate 210 that forms the lower body 201.

At least one sealing member 211 may be coupled to the at least one connection hole formed in the first plate 210 that forms the lower body 201. For example, the at least one sealing member 211 may be coupled at a position corresponding to the at least one connection hole. The at least one sealing member 211 may be coupled to the at least one connection hole and seal the at least one connection hole. As the at least one connection hole is sealed by the at least one sealing member 211, the second space 140 and the accommodation space of the case 110 may be spatially separated from each other.

The sealing member 211 may include a metal and a plastic as forming materials.

The sealing member 211 may be melted at a predetermined temperature or higher. For example, when heat and/or fire occurs in the batteries 111 and the temperature of the sealing member 211 reaches the predetermined temperature or higher, the sealing member 211 may be melted.

When sealing member 211 is melted at the predetermined temperature or higher, the sealing of the connection hole by the sealing member 211 may be released between the second space 140 and the accommodation space of the case 110. When the sealing by the sealing member 211 is released, the at least one connection hole formed in the first plate 210, which forms the lower body 201, may be opened, and the second space 140 and the accommodation space of the case 110 may be spatially connected to each other.

When the sealing of the connection hole by the sealing member 211 is released in a state in which the extinguishing fluid is stored in the second space 140, the extinguishing fluid may be ejected into the accommodation space of the case 110.

At least one heat dissipating pad 240 may be disposed between the first plate 210, which forms the lower body 201, and the batteries 111 seated in the accommodation space of the case 110. For example, the at least one heat dissipating pad 240 may be disposed to be in contact with the first plate 210 and also disposed to be in contact with the batteries 111. When heat is generated in the batteries 111, the at least one heat dissipating pad 240 may transfer the generated heat to the first plate 210 that forms the lower body 201. The at least one heat dissipating pad 240 may be a component that allow the heat to be transferred between the batteries 111 and the cooling and fire extinguishing module 120.

A plurality of pin-shaped protrusions protruding to the first space 130 may be formed on the separating plate 220. For example, when the plurality of pin-shaped protrusions protrude toward the first space 130, a contact area of the separating plate 220 with the refrigerant may increase to have an effect that heat transfer efficiency increases.

A plurality of pin-shaped protrusions protruding to the second space 140 may be formed on the separating plate 220. For example, when the plurality of pin-shaped protrusions protrude toward the second space 140, a contact area of the separating plate 220 with the extinguishing fluid may increase to have an effect that efficiency of heat transfer and cooling effects increases.

When the plurality of pin-shaped protrusions protruding toward the first space 130 and the second space 140, respectively, are formed on the separating plate 220, the separating plate 220 may have the increased contact areas with the refrigerant and the extinguishing fluid, respectively, and the efficiency of the heat transfer and cooling effects of the refrigerant and the extinguishing fluid may be maximized.

Figure 3:
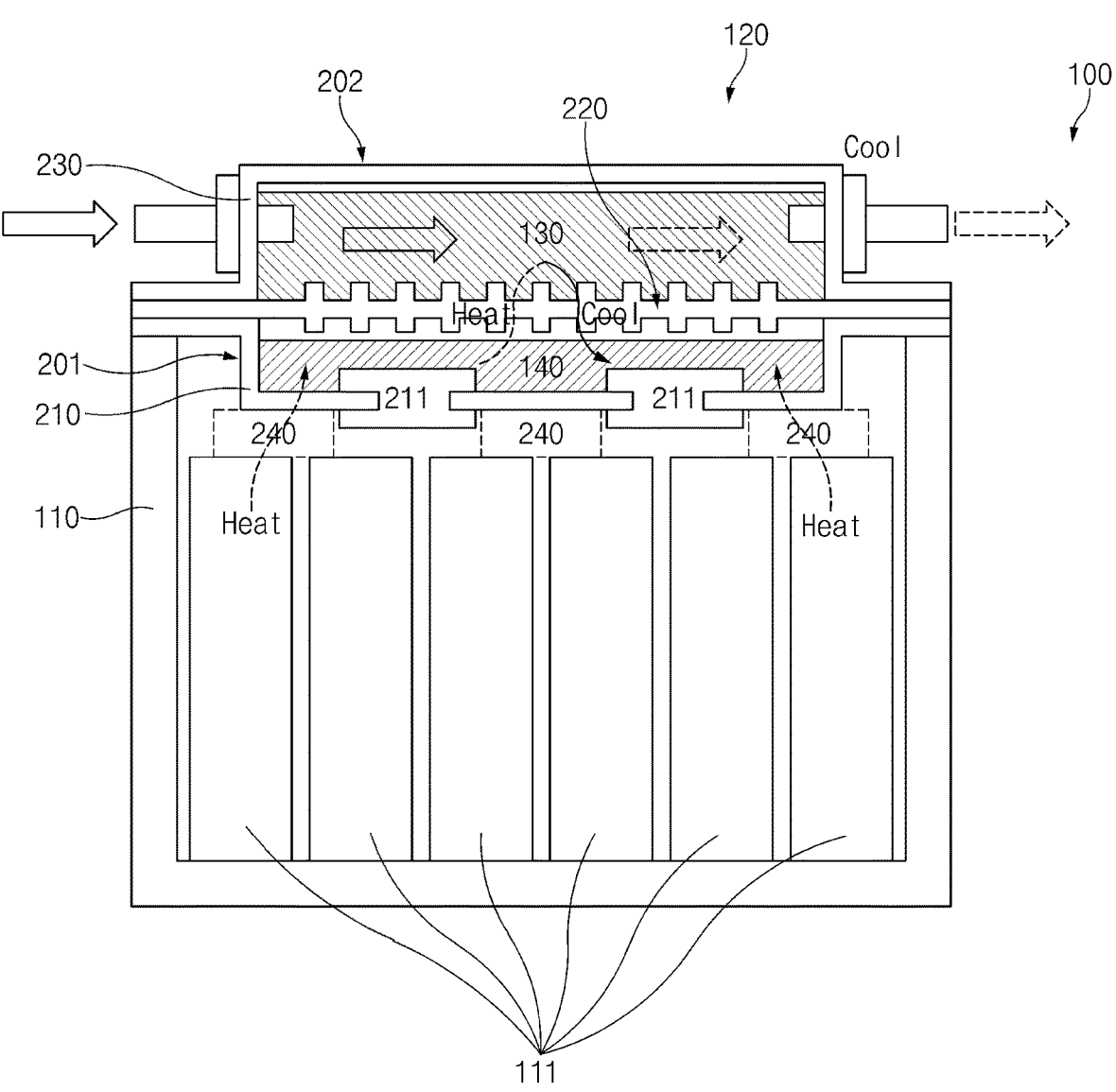
FIG. 3 is a view illustrating a cooling principle of a battery module according to another embodiment of the present disclosure.

FIG. 3 illustrates a cooling principle of a battery module according to another embodiment of the present disclosure.

Heat may be generated in batteries 111 accommodated in an accommodation space of a case 110 of a battery module 100. For example, the heat may be generated in the batteries 111 while charging and discharging is performed on the batteries 111 in the battery module 100.

The heat generated in the batteries 111 may be transferred to a cooling and fire extinguishing module 120 through at least one heat dissipating pad 240. For example, the heat generated in the batteries 111 may be transferred to the at least one heat dissipating pad 240 disposed to be in contact with the batteries 111. The at least one heat dissipating pad 240 that has received the heat from the batteries 111 may transfer the heat to the cooling and fire extinguishing module 120 (or a first plate 210 that forms a lower body 201) disposed to be in contact with the heat dissipating pad 240.

The second space 140 may receive the heat from the first plate 210 that forms the lower body 201. When an extinguishing fluid is stored in the second space 140, the extinguishing fluid may receive the heat from the first plate 210.

The extinguishing fluid stored in the second space 140 inside the cooling and fire extinguishing module 120 may absorb the transferred heat. At least a part of the extinguishing fluid may absorb the heat and be subject to a phase change from a liquid state to a gas state in the second space 140. When the extinguishing fluid absorbs the heat and the phase is changed, the surrounding (e.g., the batteries 111 in the accommodation space) of the extinguishing fluid may be cooled. The extinguishing fluid may have a very low boiling point (e.g., 50 degrees or less), and the boiling point of the extinguishing fluid may be lower than the boiling point of the refrigerant. As the phase change of the extinguishing fluid occurs at a lower temperature than the phase change of the refrigerant, the cooling effect may be higher than that of the refrigerant.

The extinguishing fluid in the gas state, which has absorbed the heat, may transfer the heat, through a separating plate 220, to the refrigerant that flows in a first space 130 inside the cooling and fire extinguishing module 120. For example, the extinguishing fluid that has absorbed the heat may transfer the heat to the separating plate 220 having high thermal conductivity. The separating plate 220 that has received the heat may transfer the heat to the refrigerant that flows in the first space 130. The refrigerant of the first space 130, which has received the heat from the separating plate 220, may absorb the heat. The refrigerant that has absorbed the heat in the first space 130 may flow in a moving direction, and the refrigerant may move to the outside of the cooling and fire extinguishing module 120 through a gate formed in the cooling and fire extinguishing module 120.

The extinguishing fluid in the gas state, which has absorbed the heat, may lose the heat after the heat is transferred to the refrigerant. For example, the extinguishing fluid in the gas state may lose the heat and be subject to a phase change to the liquid state.

In the cooling of the battery module 100 including the cooling and fire extinguishing module 120 described above, both the refrigerant of the first space 130 and the extinguishing fluid of the second space 140 are involved in the cooling. Thus, the cooling efficiency may be higher when compared to cooling solely with a refrigerant. As the first space 130, in which the refrigerant is accommodated, and the second space 140, in which the extinguishing fluid is accommodated, are separated from each other in the cooling and fire extinguishing module 120, the leakage of the refrigerant into the batteries 111 may be prevented.

Figure 4:
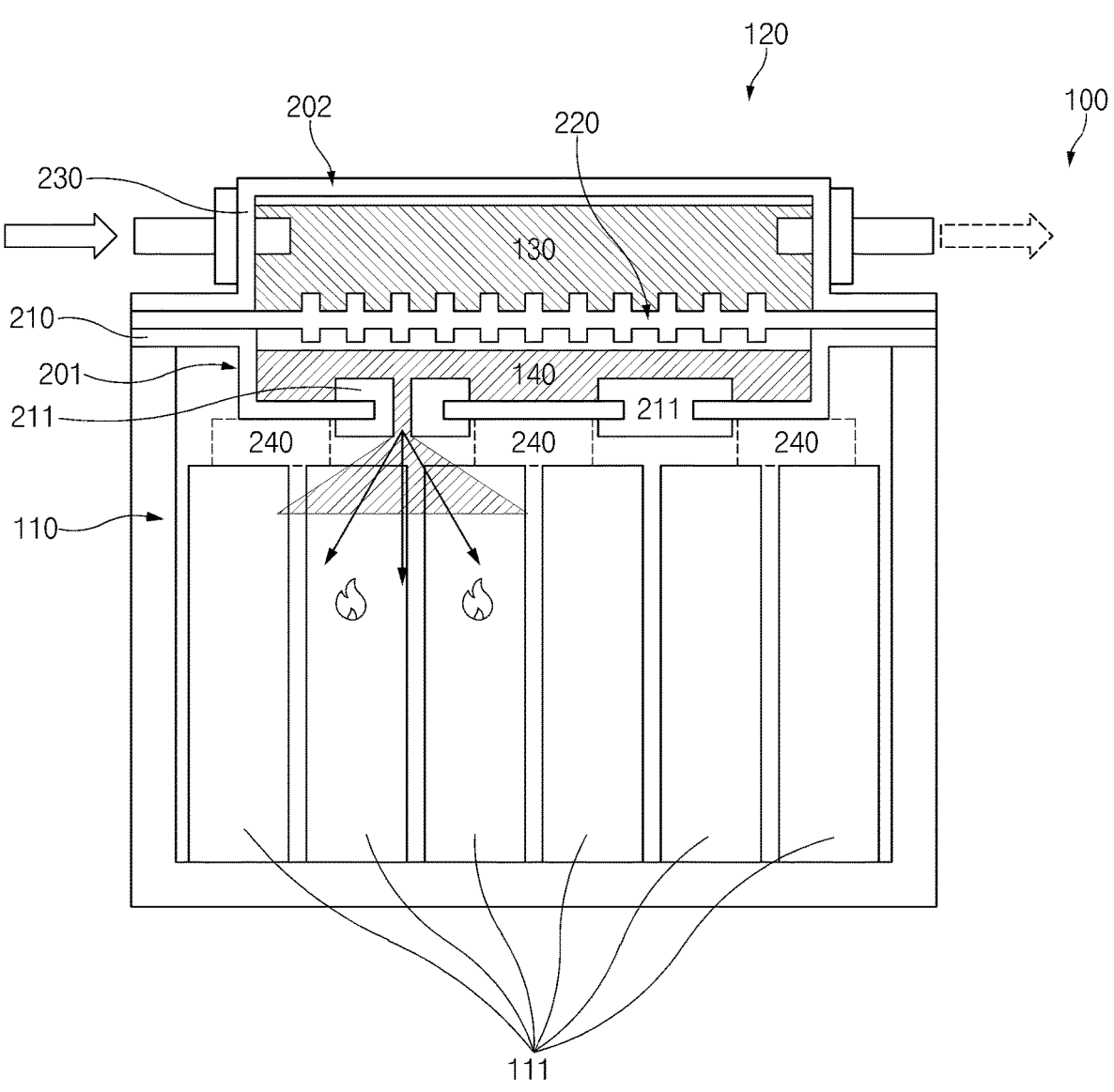
FIG. 4 is a view illustrating a fire preventing (or fire extinguishing) principle of a battery module according to further another embodiment of the present disclosure.

FIG. 4 illustrates a fire preventing (or fire extinguishing) principle of a battery module according to further another embodiment of the present disclosure.

High-temperature heat and/or a fire may occur in batteries 111 accommodated in an accommodation space of a case 110 of a battery module 100. For example, the heat having a fixed temperature or higher and/or the fire may occur in the batteries 111 while charging and discharging is performed on the batteries 111 in the battery module 100.

The high-temperature heat generated in the batteries 111 may be transferred to a cooling and fire extinguishing module 120 through at least one heat dissipating pad 240. For example, the high-temperature heat generated in the batteries 111 may be transferred to the at least one heat dissipating pad 240 disposed to be in contact with the batteries 111. The at least one heat dissipating pad 240, which has received the high-temperature heat from the batteries 111, may transfer the high-temperature heat to the cooling and fire extinguishing module 120 (or a first plate 210 that forms a lower body 201) disposed to be in contact with the heat dissipating pad 240.

The second space 140 may receive the high-temperature heat from the first plate 210 that forms the lower body 201. When an extinguishing fluid is stored in a second space 140, the extinguishing fluid may receive the high-temperature heat from the first plate 210.

The extinguishing fluid stored in the second space 140 inside the cooling and fire extinguishing module 120 may absorb the transferred heat. For example, a part of the extinguishing fluid may absorb the heat and be subject to a phase change from a liquid state to a gas state in the second space 140, and as pressure in the second space 140 increases, a part of the extinguishing fluid may be maintained in a liquid state. In the second space 140, the extinguishing fluid may be in a high pressure state in which a liquid state and a gas state are mixed.

Before the heat having the fixed temperature or higher is generated in the batteries 111, the extinguishing fluid, which is in the high pressure state in which a liquid state and a gas state are mixed, may transfer the heat to a first space 130 to perform cooling. For example, the mixed-phase extinguishing fluid (e.g., liquid phase+gas phase), which has absorbed the heat, may transfer the heat, through a separating plate 220, to the refrigerant that flows in the first space 130 inside the cooling and fire extinguishing module 120. Specifically, the extinguishing fluid that has absorbed the heat may transfer the heat to the separating plate 220 having high thermal conductivity. The separating plate 220 that has received the heat may transfer the heat to the refrigerant that flows in the first space 130. The refrigerant of the first space 130, which has received the heat from the separating plate 220, may absorb the heat. The refrigerant that has absorbed the heat in the first space 130 may flow in a moving direction, and the refrigerant may move to the outside of the cooling and fire extinguishing module 120 through a gate formed in the cooling and fire extinguishing module 120.

When the heat having the fixed temperature or higher is generated or the fire occurs in the batteries 111, the temperature of a sealing member 211 may reach a predetermined temperature or higher and the sealing member 211 may be melted. For example, the at least one sealing member 21, which is coupled to at least one connection hole formed in the first plate 210 that forms the lower body (module) 201, may be melted.

When the melted a sealing member 211 is at predetermined temperature or higher, the sealing of the connection hole by the sealing member 211 may be released between the second space 140 and the accommodation space of the case 110.

When the sealing by the sealing member 211 is released, the at least one connection hole, which is formed in the first plate 210 that forms the lower body (module) 201, may be opened, and the second space 140 and the accommodation space of the case 110 may be spatially connected to each other.

When the second space 140 and the accommodation space of the case 110 are spatially connected to each other, the extinguishing fluid may be ejected into the accommodation space inside the case 110 due to high pressure in the second space 140. For example, when the sealing by the sealing member 211 is released and the second space 140 and the accommodation space of the case 110 are connected to each other, there may be an effect (e.g., a spray effect) that, due to the high pressure in the second space 140, the mixed-phase extinguishing fluid is ejected and sprayed into the accommodation space in which the batteries 111 are disposed.

The extinguishing fluid, which has been ejected into the accommodation space of the case 110 in which the batteries 111 are disposed, may block thermal diffusion from the batteries 111 in a high-temperature state and/or a state with the fire. The ejected extinguishing fluid may extinguish the fire occurring in the batteries 111, and may suppress ignition. In the fire prevention (or extinguishment) of the battery module 100 including the cooling and fire extinguishing module 120 described above, the extinguishing fluid may be ejected toward the batteries 111 to rapidly extinguish the fire and also suppress additional ignition. In the cooling and fire extinguishing module 120, the first space 130 in which the refrigerant is accommodated, and the second space 140 in which the extinguishing fluid is accommodated may be structurally separated from each other even during the fire prevention (or extinguishment). Accordingly, the leakage of the refrigerant into the batteries 111 may be prevented.

Although the present disclosure has been described with reference to the limited embodiments and drawings, the present disclosure is not limited thereto and may be variously implemented by those of ordinary skill in the art to which the present disclosure pertains, within the technical idea of the present disclosure and an equivalent of the appended claims.

DESCRIPTION OF REFERENCE NUMERALS

100: Battery module
110: Case
111: Batteries (or battery assembly)
120: Cooling and fire extinguishing module
130: First space
140: Second space
201: Lower body
202: Upper body
211: Sealing member
210: First plate
220: Separating plate
230: Second plate
240: Heat dissipating pad

The invention claimed is:

1. A battery module comprising:
a case having an accommodation space accommodating a battery; and
a cooling and fire extinguishing module disposed on the case and configured to cool heat generated in the accommodation space and extinguish a fire occurring in the accommodation space,
wherein the cooling and fire extinguishing module comprises a first space through which a refrigerant moves, or in which the refrigerant is accommodated; and
a second space which is separate from the first space and stores an extinguishing fluid,
wherein the first space, the second space, and the accommodation space are arranged one on top of another with the second space more adjacent to the accommodation space than the first space.

2. The battery module of claim 1, wherein the cooling and fire extinguishing module comprises:
a body including the first space and the second space, and coupled to the case; and
a separating plate disposed to cross the body and to separate an inner space of the body into the first space and the second space.

3. The battery module of claim 1, wherein the cooling and fire extinguishing module comprises:
a first plate coupled to the case so as to cover the accommodation space and forming a lower body;
a separating plate having a portion coupled to the first plate and separating the first space and the second space from each other; and
a second plate having a portion coupled to the separating plate and forming an upper body.

4. The battery module of claim 3, wherein the first plate and the separating plate form the second space, and
the separating plate and the second plate form the first space.

5. The battery module of claim 1, wherein the cooling and fire extinguishing module comprises:
at least one connection hole through which the second space and the accommodation space are spatially connected to each other; and
a sealing member sealing the connection hole, wherein the sealing member is melted at a predetermined temperature or higher such that the sealing of the connection hole is released.

6. The battery module of claim 5, wherein the sealing member is melted at the predetermined temperature or higher such that the extinguishing fluid is ejected into the accommodation space.

7. The battery module of claim 1, wherein the cooling and fire extinguishing module receives the heat through at least one heat dissipating pad disposed in contact with the cooling and fire extinguishing module.

8. The battery module of claim 1, wherein the cooling and fire extinguishing module comprises a separating plate separating the first space and the second space from each other,
wherein a plurality of pin-shaped protrusions protruding toward the first space and the second space, respectively, are formed on the separating plate.

9. The battery module of claim 1, wherein the extinguishing fluid has a higher insulating property than the refrigerant.

10. The battery module of claim 1, wherein the extinguishing fluid has a lower boiling point than the refrigerant and transfers the heat through a phase change.

11. The battery module of claim 1, wherein the extinguishing fluid transfers heat generated in the battery to the first space through the phase change.

12. The battery module of claim 1, wherein at least a portion of the second space is inside the accommodation space.

13. The battery module of claim 1, wherein the first space is outside the accommodation space.

* * * * *